United States Patent [19]

Click

[11] 4,291,496
[45] Sep. 29, 1981

[54] FLOWER HOLDER

[76] Inventor: Bobbie J. Click, 9900 Memorial Dr., Apt. 232, Houston, Tex. 77024

[21] Appl. No.: 120,565

[22] Filed: Feb. 11, 1980

[51] Int. Cl.³ .............................................. A01G 5/00
[52] U.S. Cl. ............................................ 47/55; 24/5; 428/24
[58] Field of Search ............... 47/41, 41.55, 55, 41.11, 47/41.12; 24/5, 6; 248/27.8; 428/4, 5, 7, 15, 17, 22–24, 27

[56] References Cited

U.S. PATENT DOCUMENTS

| | | | |
|---|---|---|---|
| 2,593,797 | 4/1952 | Robbins | 47/55 |
| 3,142,100 | 7/1964 | Shoemaker | 47/41 X |
| 3,760,460 | 9/1973 | Myers | 47/41 X |
| 4,091,567 | 5/1978 | Higdon et al. | 47/55 |
| 4,201,806 | 5/1980 | Cole | 248/4 |

FOREIGN PATENT DOCUMENTS

| | | | |
|---|---|---|---|
| 274403 | 5/1914 | Fed. Rep. of Germany | 428/24 |
| 682789 | 11/1952 | United Kingdom | 47/41 |

*Primary Examiner*—James R. Feyrer
*Attorney, Agent, or Firm*—Ranseler O. Wyatt

[57] ABSTRACT

A device for holding flowers such as are employed in forming bouquets so that the holder and all of the decorations thereon may be made up in advance, so that all that is necessary is to attach the flower or flowers at the time of sale.

3 Claims, 2 Drawing Figures

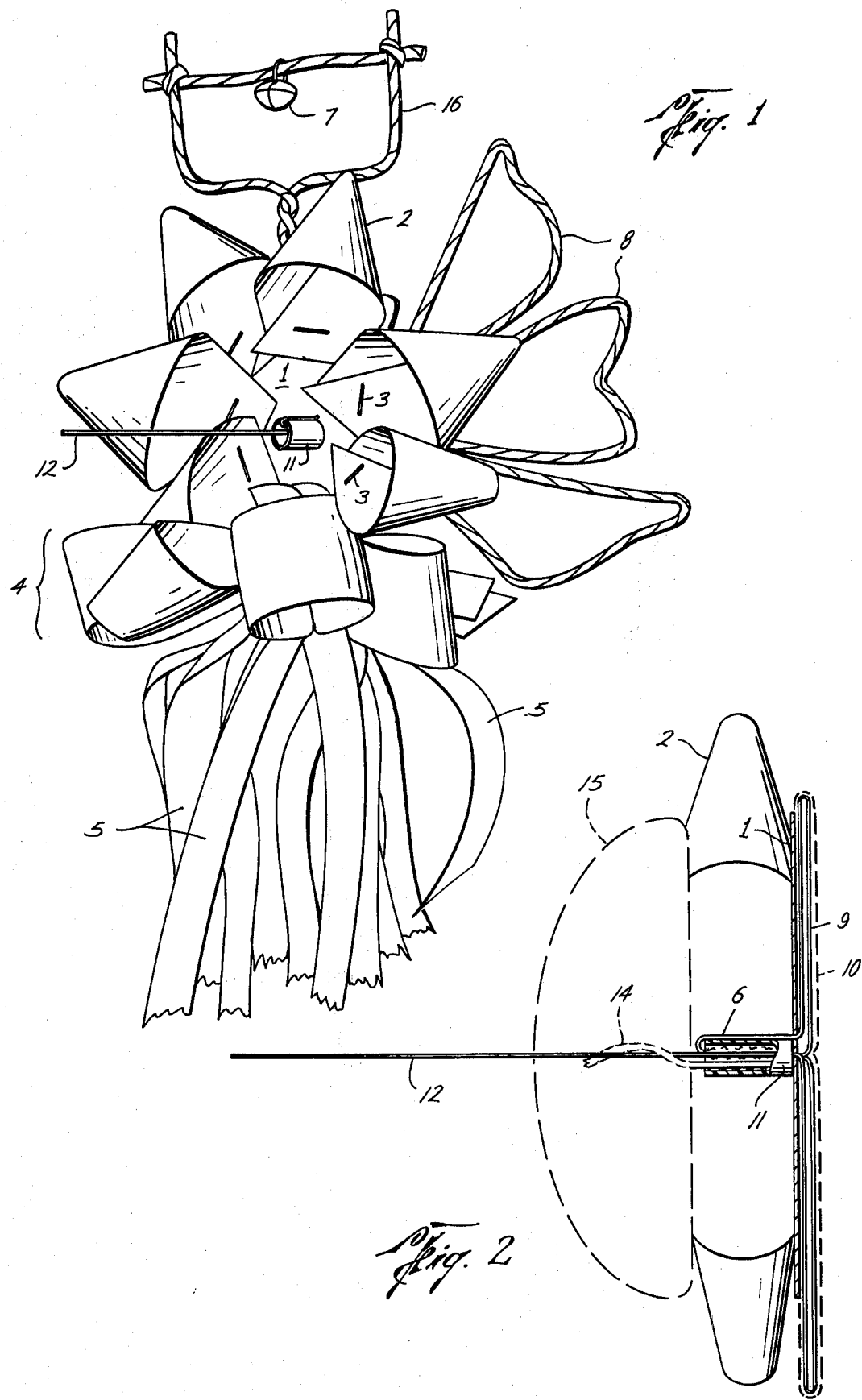

FLOWER HOLDER

BACKGROUND OF THE INVENTION

In making up bouquets for football games, an elaborate holder is prepared, including fancy decorations, and with the school colors in streamers. To make up these holders requires skill and time, and thus limits the sales possible because the flowers must be fresh. It is an object of this invention to provide a flower holder to be included in the decorations that will permit pre manufacture of the entire bouquet except for the flower or flowers, and when a sale is made, the flower or flowers may be quickly and easily mounted, thus greatly increasing the potential sales possible by the florist.

SUMMARY OF THE INVENTION

A flower holder to be mounted in the supporting decorations for a bouquet. The flower holder consists of a light wire, or the like, bent to form a vertical support behind the decorations and bent again so that the respective ends of the wire form horizontal members extending through the central portion of the decorations, said extended ends passing through the backing, one adjacent a moistening cup and one through the moistening cup, the end adjacent the moistening cup being bent backwardly and extending into the cup, anchoring the cup in place, and the other extended end securing the stem of the flower or flowers, and any other decoration desired, such as the initials of the school, or the user, and the remaining portion of the extended wire then bent into and hidden in the flower. The moistening cup is filled with wet cotton to maintain the flower or flowers fresh.

BRIEF DESCRIPTION OF THE DRAWINGS

FIG. 1 is a front elevational view of the flower holder mounted in the decorations, and FIG. 2 is a side elevational view, in cross section, of the device mounted in the backing and with a flower shown in dotted lines, mounted on the support.

DESCRIPTION OF THE PREFERRED EMBODIMENT

In the drawings, the numeral 1 designates a cardboard backing sheet on which the ribbons 2, 2 are mounted as by staples 3, 3, in a decorative manner, with a bow 4 formed near the lower margin of the backing sheet and the ends of the ribbons forming streamers 5, 5. Usually additional decorations are mounted on the backing sheet 1, such as the goal post 16 and a minature football 7, and other colorful additions, as the fabric covered wires 8, bent into decorative shapes.

The flower holder formed of light wire, or the like, has the vertical winged supporting member 9 which extends diametrically across said backing sheet 1 and below said sheet, forming a supporting stem for securing the bouquet to the garment (not shown) of the user. Said wire is covered with a waterproof tape, as 10, and the uncovered ends thereof extend through the backing sheet 1 and one end 6 of the wire is bent backwardly to extend into the moistening cup 11 in which packing of absorbent material as 11' is maintained and the other end 12 of the wire extends axially through the cup 6 and outwardly from the cup 6.

The bouquet holder as above described is made up in advance of the prospective sale, and when a sale is made, a flower, such as a large mum, as 15, is mounted on the extended wire 12, and the stem 14 of the flower is inserted in the moistener cup 6. Additional decorations may be fastened to the extended end of the wire 12, and the remainder of the wire, if any, then bent over into the flower, out of sight. Mounting the mum, or other flower, on the holder requires only a few minutes, and the bouquet is ready for the user.

What I claim is:

1. In a flower holder for use on bouquet backings, a length of light wire bent doubled to form a winged vertical support on the back of a stiff backing member, the said wire being bent so that the respective ends thereof extend outwardly from the said backing and extend axially through the backing member, a moistener cup mounted horizontally and axially on said backing member, one of the ends of said wire forming the vertical support being rearwardly bent and terminating in said cup and the other end extending longitudinally and axially through the said cup and extending outwardly therefrom to support the stem of a flower to be mounted on said backing.

2. The device defined in claim 1 wherein a moist packing is mounted in said moistening cup.

3. The device defined in claim 2 wherein the vertical support extends downwardly beneath the moistener cup forming a holding means for maintaining the assembled bouquet on the garment of a user.

* * * * *